United States Patent [19]

Russell

[11] 4,281,960
[45] Aug. 4, 1981

[54] AUTOMATIC BROACH MACHINE LOADER

[75] Inventor: John X. Russell, Troy, Mich.

[73] Assignee: The Babcock & Wilcox Company, New Orleans, La.

[21] Appl. No.: 72,797

[22] Filed: Sep. 5, 1979

[51] Int. Cl.³ ............................................. B65G 25/02
[52] U.S. Cl. .................................... 414/750; 409/266
[58] Field of Search ................. 414/18, 222, 749, 750;
198/339, 740, 741, 747; 409/256, 257, 266, 322, 343, 344, 269, 270, 286

[56] References Cited

U.S. PATENT DOCUMENTS

| | | | |
|---|---|---|---|
| 3,140,776 | 7/1964 | Craver | 198/741 X |
| 3,768,667 | 10/1973 | Paumier et al. | 414/750 |
| 3,980,182 | 9/1976 | Esser et al. | 414/750 |
| 4,209,087 | 6/1980 | Kushigian | 198/339 |
| 4,212,573 | 7/1980 | Fields | 409/257 X |

Primary Examiner—James L. Rowland
Attorney, Agent, or Firm—Vytas R. Matas; Robert J. Edwards

[57] ABSTRACT

An improved automatic loading and unloading device (10) that can be used for high production machinery. The device (10) utilizes "straight-through" feeding of workpieces across a shuttle table (16) to a work station and through same to a discharge chute (70) minimizing the jamming of the pieces. In addition, the device simultaneously indexes new workpieces on the shuttle table (16) by means of a loading/unloading assembly (14) while previous workpieces are being machined. The device can also be used for supplying and indexing workpieces on a batch basis rather than an individual workpiece basis.

8 Claims, 6 Drawing Figures

AUTOMATIC BROACH MACHINE LOADER

TECHNICAL FIELD

The present invention relates generally to a machine loading and unloading device and more particularly to an improved loading and unloading device for an automatic broaching machine.

BACKGROUND ART

High production metal cutting machinery typically have loading and unloading devices associated with them to assist in the supply of parts to the metal cutting station and the removal of the finished parts therefrom. Many types of loading and unloading devices have been developed, however, most of these devices require multiple sequential indexing operations before the incoming part reaches the metal cutting station and do not simultaneously machine the part while a new incoming part is being indexed into position. In addition, most of the indexing operations involve changing the direction of travel of the incoming part which causes some parts to jam the incoming portions of these devices. These conditions appear to be especially true for loading and unloading devices used with automatic broaching machines. The loading and unloading devices for these machines typically have multiple indexing operations which change the direction of travel of the parts to be broached and do not utilize simultaneous indexing/machining operations. The end result is that the broaching operation is relatively slow, the broaching machine is not utilized at its optimum efficiency and jamming of incoming parts is relatively common.

Because of this, it has become desirable to develop a loading and unloading device that utilizes a minimum of indexing operations, that employs "straight through" feeding of parts to be machined, and that performs various operations, such as indexing and machining, simultaneously.

SUMMARY OF THE INVENTION

The present invention solves the aforementioned problems associated with the prior art as well as other problems by providing an improved loading and unloading device for high production machinery, such as an automatic broaching machine. The device utilizes "straight-through" feeding of the parts through the broaching station to a discharge chute, thus minimizing the possibility of parts jamming the device and/or the broaching station. In addition, the device utilizes a minimum of indexing operations prior to broaching and simultaneously performs these indexing operations while machining the part. In this manner, the speed of the loading and unloading operation is increased considerably and the broaching machine operates near its optimum efficiency.

In view of the foregoing, it will be seen that one aspect of the present invention is to provide a loading and unloading device that utilizes "straight-through" feeding of parts through the device and the machine it supplies with parts.

Another aspect of the present invention is to provide a loading and unloading device that utilizes a minimum of indexing operations to transport the parts therethrough.

Still another aspect of the present invention is to provide a loading and unloading device that performs an operation, such as part indexing, simultaneously with the operations of the machine that it is supplying with parts and removing finished parts therefrom.

Yet still another aspect of the present invention is to provide a loading and unloading device that can simultaneously supply a batch of parts to a machine while the machine is simultaneously performing an operation on another batch of parts.

Yet still another aspect of the present invention is to provide a loading and unloading device that determines the suitability of incoming parts for the operation to be performed thereon and rejects those parts found to be unsuitable.

These and other aspects of the present invention will be more clearly understood after a review of the following description of the preferred embodiment when considered with the following drawings.

DESCRIPTION OF THE PREFERRED EMBODIMENT

Figure 1:
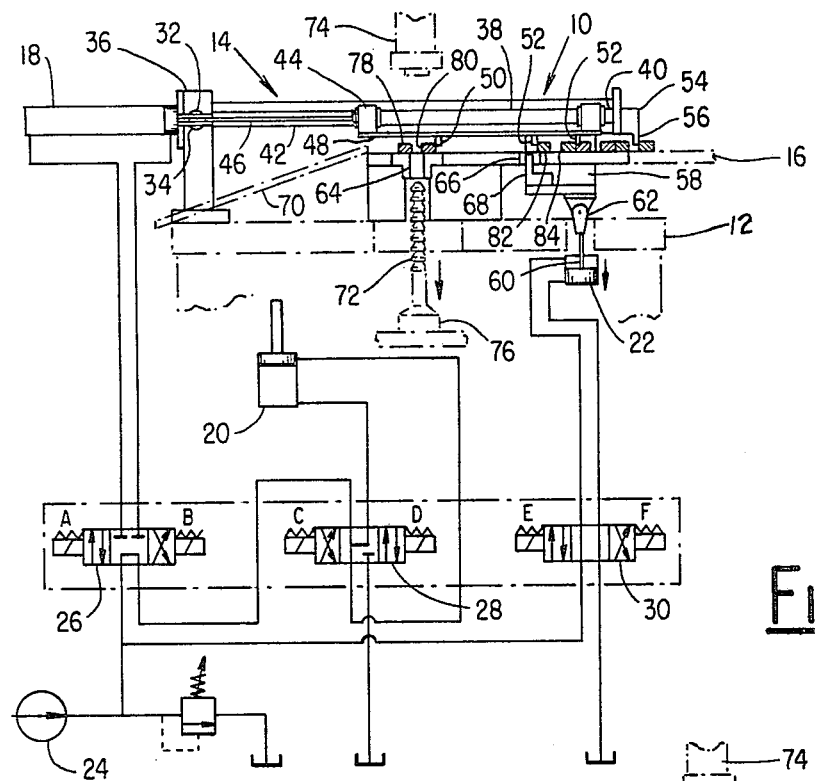
FIG. 1 is a front plan view of the loading and unloading device, partially in schematic form, showing the relative position of the components after the broaching operation has been completed.

Referring now to the drawings wherein the illustrations are for the purpose of describing the preferred embodiment of the invention and are not intended to limit the invention hereto, FIG. 1 shows a front plan view of the automatic loading and unloading device 10 which is adaptable to be used with a broaching machine. Automatic loading and unloading device 10 is composed of a main frame 12, a loading/unloading assembly 14, a shuttle table 16, a hydraulic shuttle cylinder 18, a hydraulic metering cylinder 20, a hydraulic lift cylinder 22, and a source 24 of hydraulic fluid. The shuttle table 16, lift cylinder 20 and metering cylinder 22 are firmly attached to the main frame 12. Each of the hydraulic cylinders is provided with a two-position control valve, i.e., control valve 26 is provided for shuttle cylinder 18, control valve 28 is associated with metering cylinder 20, and control valve 30 regulates the operation of lift cylinder 22.

Shuttle cylinder 18 is attached to loading/unloading assembly 14 by standard fastener means and the complete assembly is pivotally attached to main frame 12 by means of a pin 32 received in an aperture 34 provided in an upright member 36 attached to main frame 12. Loading/unloading assembly 14 is comprised of a carriage assembly 38 which is laterally movable over guide bars 40 which are retained at either end thereof by the frame 42 of loading/unloading assembly 14. One end 44 of carriage assembly 38 is attached to the output shaft 46 of shuttle cylinder 18 so as to be laterally movable therewith on guide bars 40. Attached to the underside of carriage assembly 38 is a pair of slide plates 48 to which is movably attached an ejecting finger 50 and spaced apart positioning fingers 52. Slide plates 48 are in a spaced relationship permitting the passage of the broaching tool therebetween. The end 54 of loading/unloading assembly 14 opposite shuttle cylinder 18 is provided with a sizing probe 56 whose function is to insure that only workpieces with the proper size aperture therein are permitted to be advanced to the broaching station. Also attached to frame 42 is a bracket 58 which is connected to output shaft 60 of lift cylinder 22 by means of a clevis 62 and which permits the complete assembly comprised of shuttle cylinder 18 and a loading/unloading assembly 14 to be pivotally rotated as a unit about pin 32.

The shuttle table 16 has provided therein an aperture 64 of sufficient size to permit the passage of the desired broach therethrough. Another aperture 66 is also provided in shuttle table 16 for the receipt of a stop pin 68 which is connected to bracket 58 and is movable therewith. The discharge side of shuttle table 16 is provided with a discharge chute 70 to assist in the removal of the finished machined workpiece from the broaching station.

With respect to the broaching tools required, a broach 72 of the desired size is held in a tool holder 74 above the workpiece to be broached and the shuttle table 16. A pulling tool 76 is oppositely disposed from tool holder 74 and positioned beneath shuttle table 16 and is used to engage the free end of the broach 72 as it passes through the workpiece being broached and through aperture 64 in shuttle table 16 thus permitting tool holder 74 to disengage the upper end of broach 72 so that the finished machined workpiece can be removed from the broaching station.

Figure 2:
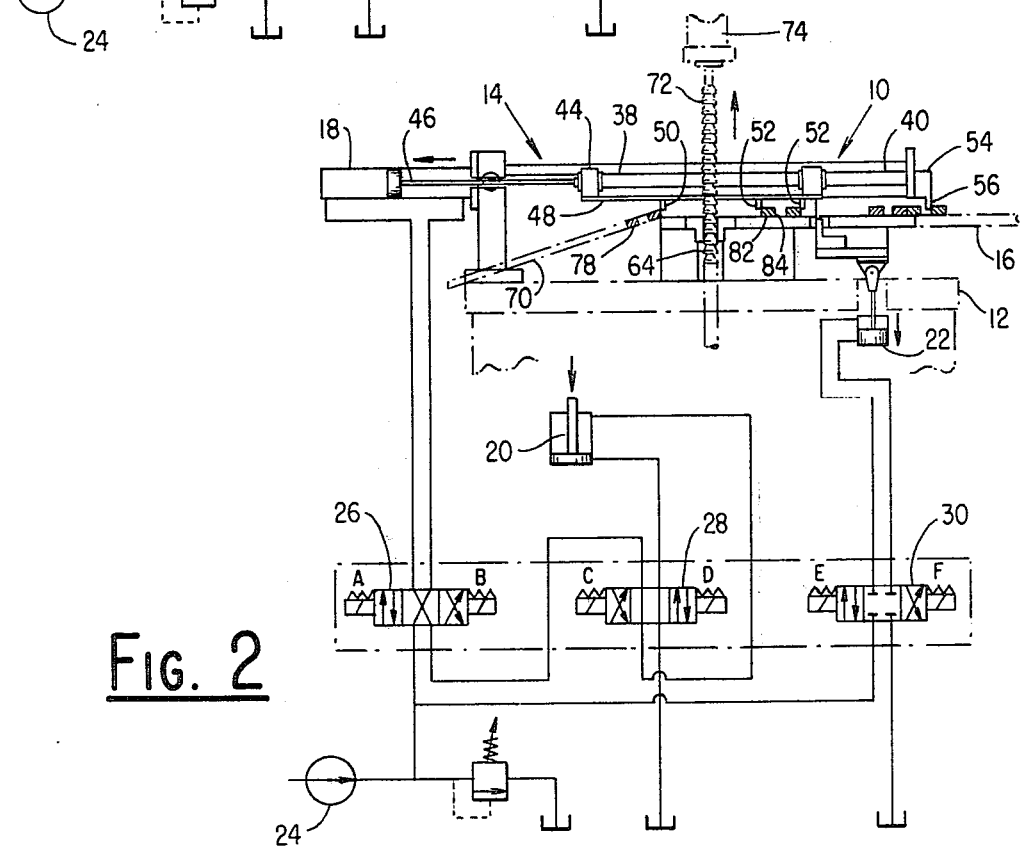
FIG. 2 is a front plan view of the loading and unloading device, partially in schematic form, showing the relative position of the components during the removal of a finished part from the broaching station and the retraction of the broach into the upper tool holder.

As for the operation of the automatic loading device 10, assume a workpiece 78 having an aperture 80 has been broached. Referring again to FIG. 1, a finished machined workpiece 78 is shown positioned above aperture 64 in shuttle table 16 and above broach 72 which is below table 16 and is held by pulling tool 76. At the completion of the broaching operation, sensing means cause the deenergization of solenoid E for control valve 30 and the energization of solenoids B and D for control valves 26 and 28, respectively, resulting in the actuation of shuttle cylinder 18 and metering cylinder 20 which causes the output shaft 46 of cylinder 18 and carriage assembly 38 attached thereto to move to the left to the position shown in FIG. 2. While so moving, ejecting finger 50 pushes finished machined workpiece 78 to the discharge end of shuttle table 16 and into discharge chute 70. At the same time, positioning fingers 52 advance the next workpiece 82 toward the broaching station.

The internal volume of metering cylinder 20 is approximately one-half (½) that of shuttle cylinder 18 thus causing the lateral movement of the output shaft 46 and carriage assembly 38 to be approximately one-half (½) the overall length of guide bars 40. By interrupting the travel of carriage assembly 38 in this manner, the broach 72 can be advanced upwardly through the empty broaching station and through the spaced apart slide plates 48 so that its top end can be gripped by tool holder 74 and raised above shuttle table 16. After broach 72 is gripped by tool holder 74, pulling tool 76 becomes disengaged from the bottom end thereof allowing the bottom end to be free permitting the broach 72 to be raised to its fully retracted position. It should be noted that broach 72 is retracted through an empty broaching station rather than through finished machined workpiece 78 since the latter approach would result in the metal chips being retained in the broach teeth to crack the broach and scratch the machined walls of workpiece 78.

Figure 3:
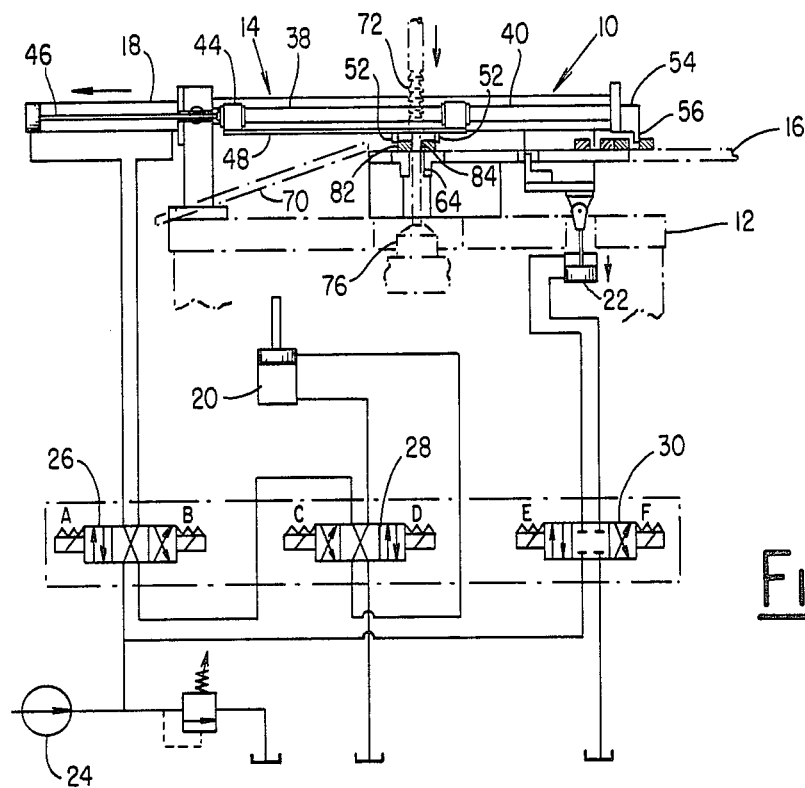
FIG. 3 is a front plan view of the loading and unloading device, partially in schematic form, showing the relative position of the components during the beginning of the broaching operation.

When tool holder 74 and broach 72 reach their fully retracted upright position, sensing means cause the deenergization of solenoid D for control valve 28 and the energization of solenoid C for same which results in the deactuation of metering cylinder 26. This deactuation allows output shaft 46 of shuttle cylinder 18 to become fully retracted within cylinder 18 causing carriage assembly 38 to move the remaining distance laterally to the left on guide bars 40, as shown in FIG. 3. This movement causes workpiece 82 to be moved laterally by positioning fingers 52 so that the aperture 84 therein is aligned with broach 72 and with aperture 64 provided in shuttle table 16. The tool holder 74 and broach 72 are then brought downwardly so that broach 72 passes through aperture 84 in workpiece 82 and aperture 64 provided in shuttle table 16. After the bottom end of broach 72 has passed through apertures 84 and 64, it is gripped by pulling tool 76 and is pulled through the aforementioned apertures. During this process, tool holder 74 merely acts as a support for broach 72. As tool holder 74 approaches workpiece 82 it releases broach 72 so that it may pass therethrough completing the broaching process.

Figure 4:
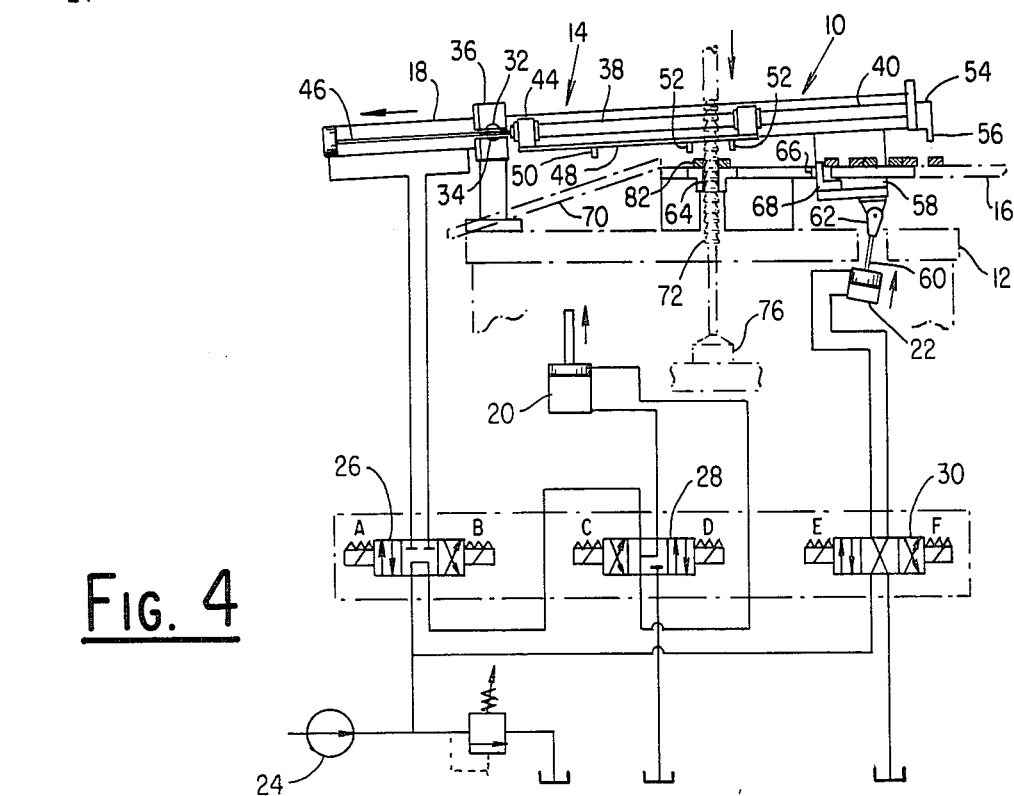
FIG. 4 is a front plan view of the loading and unloading device, partially in schematic form, showing the relative position of the components and particularly illustrating the tilting of the shuttle cylinder and the loading/unloading assembly during the broaching operation.

While the broaching operation is occurring, solenoids A and C for control valves 26 and 28, respectively, are de-energized and solenoid F for control valve 30 is energized resulting in lift cylinder 22 being actuated causing output shaft 60 of cylinder 22 to move upwardly. This upward movement causes the combination of shuttle cylinder 18 and loading/unloading assembly 14 to pivot about pin 32 so as to be tilted downwardly, as shown in FIG. 4. Actuation of lift cylinder 22 also causes stop pin 68 to pass through aperture 66 in shuttle table 16. In this orientation, the sizing probe 56 is raised above the top surfaces of the incoming workpieces allowing these workpieces to move laterally on shuttle table 16 toward the broaching station. Stop pin 68, however, prevents these workpieces from proceeding too far toward the broaching station so as to not interfere with the broaching process, thus preserving the integrity of the broaching tooling.

Figure 5:
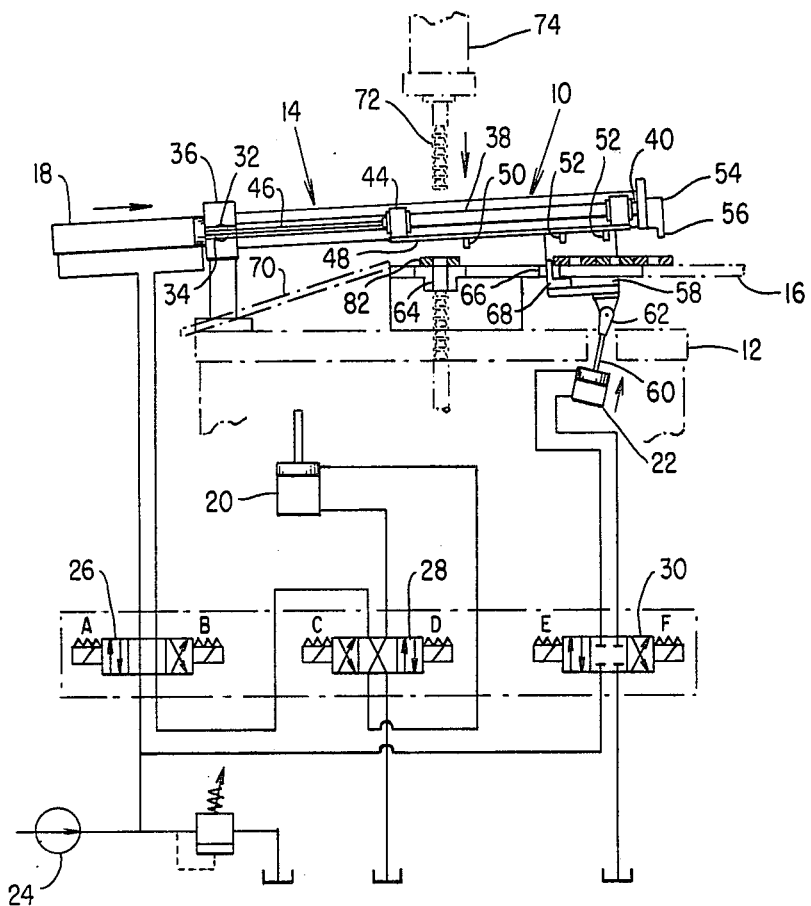
FIG. 5 is a front plan view of the loading and unloading device, partially in schematic form, showing the relative position of the components after the broaching operation has been completed and prior to the return of the shuttle cylinder and the loading/unloading assembly to the horizontal position.

After the workpieces have been properly advanced and indexed against stop pin 68, solenoid F for control valve 30 is de-energized and solenoids A and C for solenoids 26 and 28, respectively, are energized which results in the actuation of shuttle cylinder 18 and the extension of output shaft 46 which, in turn, causes carriage assembly 38 to laterally move to the right on guide bars 40 to its original position, as shown in FIG. 5. Upon arriving at its original position, solenoids A and C for control valves 26 and 28, respectively, are deenergized and solenoid E for control valve 30 is energized causing the retraction of output shaft 60 into lift cylinder 22 which results in the complete assembly of the shuttle cylinder 18 and loading/unloading assembly 14 to pivot about pin 32 and return to its original horizontal position, as shown in FIG. 1. In this position, the sizing probe 56 enters the apertures of the incoming workpieces to insure that they are the proper size thus insuring that the broach will not be damaged or broken by machining an undersized aperture.

Figure 6:
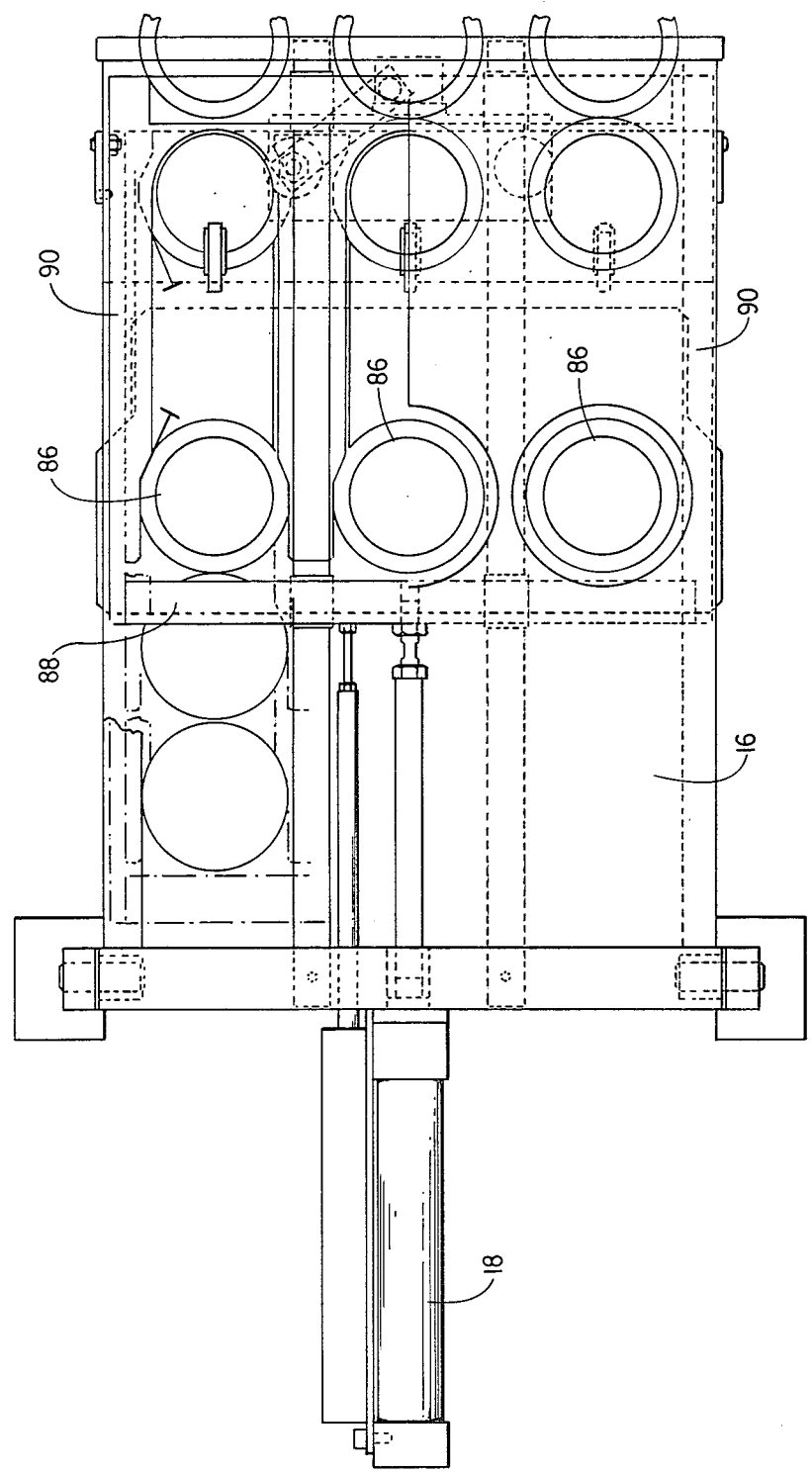
FIG. 6 is a top plan view of the input portion of the loading/unloading device showing a plurality of inputs for a broaching machine that can broach more than one part at a time.

This automatic loading device can also be revised so that more than one workpiece is machined simultaneously. As shown in FIG. 6, three workpieces 86 are being advanced across shuttle table 16 by a carriage assembly 88 attached to shuttle cylinder 18. Depending upon the size of the workpieces, the side rails 90 are adjustable to accommodate as many pieces as possible for simultaneous machining. Similarly, because of the width of the shuttle table 16, one workpiece having a relatively large diameter can be readily advanced on shuttle table 16 to the broaching station for machining. Thus, this automatic loading device can accommodate a wide range of workpiece sizes and can supply workpieces individually to the broaching station or in multiples for simultaneous machining thereof.

Whether this automatic loading and unloading device is used to index workpieces individually or in multiples thereof, the workpieces proceed to the machining station with a minimum of indexing operations and in a straight line, thus minimizing the possibility of parts jamming the loading device or the broaching machine. In addition, whether individual workpieces or multiples thereof are indexed simultaneously, indexing operations on new workpieces occur simultaneously while the previous workpieces are being broached. Because of this, the speed of the loading and unloading operations is increased considerably resulting in the broaching machine being used at near its optimum efficiency. Also, this automatic loading and unloading device is simple in construction and operation which increases its reliability and makes maintenance thereof a relatively easy task. And lastly, even though this device has been disclosed in conjunction with a broaching machine, it is universal in nature and can be used with any type of high production machinery which requires a constant supply of parts.

Certain modifications and improvements will occur to those skilled in the art upon reading the foregoing description. It will be understood that all such improvements and modifications have been deleted herein for the sake of conciseness and readability but are properly within the scope of the following claims.

I claim:

1. A device for supplying parts to and for removing parts from a machining station having a machining tool acting in a reciprocating manner between a start machining position and a finish machining position comprising a shuttle table on which said parts are conveyed to said machining station, means for indexing said parts on said shuttle table as they traverse same to said machining station, and means for removing said parts from said machining station at the end of the movement of the tool through said part, said indexing means being selectively engaged with said parts on said shuttle table so as to permit the advancement of said parts on said shuttle table in one position when said indexing means is engaged with parts on said shuttle table and the introduction of new parts onto said shuttle table during a second position when said indexing means is disengaged from the parts on said shuttle table, the machining of said part at said machining station being performed with said indexing means in said second position.

2. The device as defined in claim 1 further including stop means limiting the movement of said new parts being introduced onto said shuttle table during said machining process to prevent interference of new parts with said machining process.

3. The device as defined in claim 1 wherein the next part to be machined is laterally moved on said shuttle table by said indexing means during the resetting of the tool used to machine said part at said machining station from its finished machining position to its start machining position so as to place the next part adjacent said machining station.

4. The device as defind in claim 1 wherein said indexing means conveys said parts on said shuttle table to said machining station and away therefrom in an approximately straight-line path.

5. The device as defined in claim 1 further including means for determining the size of each part to be machined being introduced onto said shuttle table to insure that the part is suitable for the machining operation, said part size determining means being connected to said indexing means and being operable therewith.

6. The device as defined in claim 1 wherein said machining station can accommodate a plurality of said parts at a time for simultaneous machining of same and wherein said indexing means conveys a plurality of said parts simultaneously to said machining station for simultaneous machining of same.

7. A device for supplying parts to and for removing parts from a machining station comprising a shuttle table on which said parts are conveyed to said machining station, means for indexing said parts on said shuttle table as they traverse same to said machining station, means for removing said parts from said machining station, said indexing means conveying said parts on said shuttle table to said machining station and away therefrom in an approximately straight-line path and a sizing probe connected to be operable with said indexing means to check the suitability of the parts for machining at the machining station.

8. A device for supplying parts to and for removing parts from a machining station comprising a shuttle table on which said parts are conveyed to said machining station, means for indexing said parts on said shuttle table as they traverse same to said machining station, means for removing said parts from said machining station, said indexing means conveying said parts on said shuttle table to said machining station and away therefrom in an approximately straight-line path and being tiltably actuatable from said shuttle table so as to permit the advancement of said parts on said shuttle table and the introduction of new parts onto said shuttle table during the performing of the machining process at said machining station and stop means selectively engageable with said shuttle table whenever said indexing means are tilted away from said shuttle table to prevent the advancement of parts into the machining station during the machining operation.

* * * * *